United States Patent

Justice et al.

[11] Patent Number: 5,845,877
[45] Date of Patent: Dec. 8, 1998

[54] SEALING ASSEMBLY FOR REDUCING GAPS BETWEEN MOVABLE CONTROL SURFACES OF AN AIRCRAFT

[75] Inventors: Stephen G. Justice, Canyon Country; Charles D. Erb, Quartz Hill; James W. Taylor, Valencia, all of Calif.

[73] Assignee: Lockheed Martin Corporation, Palmdale, Calif.

[21] Appl. No.: 74,637

[22] Filed: Jun. 10, 1993

[51] Int. Cl.$^6$ .......................................... B64C 1/06
[52] U.S. Cl. .................. 244/131; 244/133; 342/4
[58] Field of Search .................. 244/131, 133; 342/1–4

[56] References Cited

U.S. PATENT DOCUMENTS

| | | | |
|---|---|---|---|
| 4,395,450 | 7/1983 | Whitener | 428/116 |
| 4,404,054 | 9/1983 | Dickson et al. | 156/92 |
| 5,176,339 | 1/1993 | Schmidt | 244/54 |
| 5,216,799 | 6/1993 | Charnock et al. | 29/525.1 |
| 5,222,692 | 6/1993 | Glowacki | 244/53 R |

Primary Examiner—Peter A. Nelson
Attorney, Agent, or Firm—Robert A. Schruhl

[57] ABSTRACT

The invention is a sealing assembly for reducing the gap between an aircraft's movable flight control member and adjacent structure thereto, the flight control member and structure having external surfaces and side surfaces facing each other. In detail, the assembly includes first and second flexible bulb seals mounted on the periphery of the side surface of both the flight control member and the adjacent structure forming an extension of the external surface of both. Each of the bulb seals includes a compressible foam bulk absorber core; the core having a bottom surface, a top surface generally parallel to the bottom surface, an outer side surface, and an inward facing surface at an acute angle to the top surface. A first sheet of dielectric material is bonded to the bottom surface of the core. A second sheet of flexible resistive material is bonded to the top, and sides of the core. A third sheet of flexible magnetic radar absorbing material is bonded to the second sheet. A fourth sheet of flexible abrasion resistant material is bonded over the third sheet.

8 Claims, 3 Drawing Sheets

SEALING ASSEMBLY FOR REDUCING GAPS BETWEEN MOVABLE CONTROL SURFACES OF AN AIRCRAFT

BACKGROUND OF THE INVENTION

1. Field of the Invention

The invention relates to the field of low observable aircraft and the like and, in particular, to a sealing assembly for reducing the radar return signal produced by the gaps between flight control members, such as ailerons and flaps.

2. Description of Related Art

The design of a truly low-observable aircraft is complicated by the fact that the aircraft is likely to face a wide range of threat radars operating at different frequencies. The designer starts by examining the mission of the aircraft to determine which threat radars that may be encountered. For example a long range bomber or reconnaissance aircraft may be more concerned with detection by low frequency radars in the MHz range, while a fighter aircraft is far more likely to encounter high frequency radars in the 20 to 40 GHz range that would be used on air-to-air missiles launched from an enemy fighter. However, while the aircraft designer may concentrate on one or two particular radar frequencies the others can not be ignored and broad band protection is always sought.

The radar cross-section (RCS) of an aircraft is affected by its general shape, the type of materials used in its construction and the electromagnetic discontinuities on the surfaces thereof. Engine inlets and other openings, as well as the leading and trailing edges of the wings, rudder and elevators are major contributors to the radar signature, However, by proper contouring of the aircraft to direct the threat radar signals to non-threat directions, the incorporation of absorbing structure in the leading and trailing edges of the wings to absorb the radar signals and the use of surface coatings to eliminate electromagnetic discontinuities, major reductions in the RCS are possible.

After the more obvious RCS contributors are addressed, such things as the gap between flight control members (surfaces) or such members and wing structure can become the dominate source of the unwanted return signals. A gap is required so that the control members can move relative to each other even when the wing flexes due to aerodynamic loading and deflections, which tends to reduce the size of the gap. In addition, the normal manufacturing tolerances require that some gap exists. These gaps seriously compromise the performance of low frequency edge treatments resulting in penalties in VHF and UHF signatures. The primary scattering mechanism is diffraction due to the air gap. If the gap is small, surface currents can bridge the gap (capacitive coupling) with little disruption in the surface currents. However, with normal wing deflections under aerodynamic loading can increase the gap significantly causing the capacitive coupling effectiveness to quickly erode.

The prior art method of reducing the RCS of gaps most often tried has been the installation of conductive brushes on the ends of the control members. This provided electrical conductivity between the control member and the adjacent structure; however, its performance at the higher threat radar frequencies is poor. In addition, the bristles are prone to the collection of all sorts of contamination and distortion through aerodynamic forces.

Thus it is a primary object of the invention to provide a sealing assembly to reduce the gap between movable flight control members and adjacent structure on an aircraft.

It is another primary object of the invention to provide a sealing assembly to reduce the radar signature of an aircraft produced by the gap between movable flight control members and adjacent structure on the aircraft.

It is a further object of the invention to provide a sealing assembly to reduce the radar signature of an aircraft over a wide frequency range that is produced by the gap between movable control surfaces and adjacent structure on the aircraft.

SUMMARY OF THE INVENTION

In an aircraft, gaps are required between the various movable control members, such as ailerons, flaps, front opening slats and the like, and these control members and stationary adjacent structure so that they can move relative to each other even when the wing deflects due to aerodynamic loading. During even moderate maneuvers, the deflection of the wing tends to reduce the size of these gaps. In addition, the normal manufacturing tolerances must be accommodated. It is necessary to maintain the gap as small as possible in order to reduce the RCS of the aircraft to as low a value as possible while still accommodating movement of the control members.

The subject invention is a sealing assembly for reducing these gap between an aircraft's movable flight control member and adjacent structure thereto, the flight control member and structure having external surfaces and side surfaces facing each other. The sealing assembly includes first and second flexible bulbs seal mounted on the periphery of the side surface of the flight control member and the adjacent structure, respectively, forming an extension of the external surface of both. The bulb seals include a compressible foam bulk absorber core having a bottom surface, a top surface generally parallel to the bottom surface, an outer side surface, and an inward facing surface at an acute angle to the top surface, preferably, the acute angle is less than 45 degrees. The outer surfaces of the cores of the first and second bulb seals form extensions of the external surfaces of the movable flight control member and the adjacent structure, respectively. The core is, preferably made of a reticulated (open celled) foam coated internally with graphite paint, which is filled with a low dielectric compressible foam having a substantially smaller cell size. The RCS properties of the core will depend upon the expected threat radar frequencies. However, amount of graphite ("loading") can be easily varied to meet the RCS requirements.

A first sheet of dielectric material, preferably fiber glass, is bonded to the bottom surface of the core. A second sheet of resistive material is bonded to the top, and sides of the core. This second sheet is typically made of dielectric material having a resistive coating with a specific ohms/square material printed thereon. In fact, printing (or silk screening and the like) allows the ohms/square value to be continuously or step-wise varied along the sheets length. A third sheet of magnetic radar absorbing material is bonded to the second sheet. Such sheets are typically made of urethane containing iron microspheres. A fourth sheet of abrasion resistant material, also a dielectric material, is bonded over the third sheet. Preferably, the first and second bulb seals are covered with a low coefficient of friction coating made of a dielectric material.

It should be noted that the aircraft in general, including the movable control members and the adjacent structure thereto, are also covered with radar absorbing materials. In order to provide a smooth transition in impedance from free air to the metallic structure of the aircraft, the covering includes a sheet of resistive material having a specific ohms per square gradient along its length. The ohms per square is high at the edge and gradually decreases to a very low value. Thus, the second sheet of resistive material in the first and second bulb seals incorporate a matching ohms per square gradient.

The first, second, third and fourth sheets of material of the first and second bulb seals are joined together at the junction of the bottom and outer side surfaces of the core forming first leg portions. The first leg portions, of the first and second bulb seals extend onto the external surfaces of the control member and adjacent structure, respectively, so that the first resistive layer of the bulb seals overlaps the resistive layers of the coatings on the surfaces of the control member and adjacent structure, respectively. Additionally, the first, second, third and fourth sheets of material are joined together at the junction of the bottom and inner side surfaces of the core forming second leg portions. The second leg portions of the first and second bulb seals extend along the side surfaces of the control member and adjacent structure, respectively, so that the first resistive layer of the bulb seals overlaps the resistive layer of the coatings on the control member and adjacent structure, respectively.

The sealing assembly works by reducing the gap so as to allow capacitive coupling of surface currents through the use of treatments and shaping. Note there is still a gap but it has been substantially reduced. As the currents propagate along the edge at the control surface gap, the matched impedance surface (the second sheet of resistive material) of the first bulb seal conducts the currents onto its surface, around the corners and down into the side surface thereof (down the gap). The buildup of these currents on the first bulb seal induces a current across the controlled (smaller) gap to the second bulb seal on the adjacent structure. The second bulb seal, acts much like a capacitor in an electrical circuit. These currents are then conducted back to the surface on the adjacent structure and continue to propagate along the surface. The third sheet of magnetic absorber handles the high frequencies while the core (bulk absorber) provides additional absorption of currents that penetrate the first sheet of resistive material.

Thus with the sealing assembly installed, the gap due to wing flexing caused by aerodynamic loading is not sufficient to cause a significant decrease in capacitance coupling between the first and second bulb seals. Should the wing flex in a direction to cause the gap to further close, the first and second bulb seals may come into contact with each other. However, because they are flexible and have "ramp" type inner surfaces on the cores, the bulb seals can compress. Flight control movement only causes the bulb seals to "slide" passed each other and thereafter return to their original shape. Note that the use of an abrasive resistant fourth sheet and the low-coefficient of friction coating prevents premature wear.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
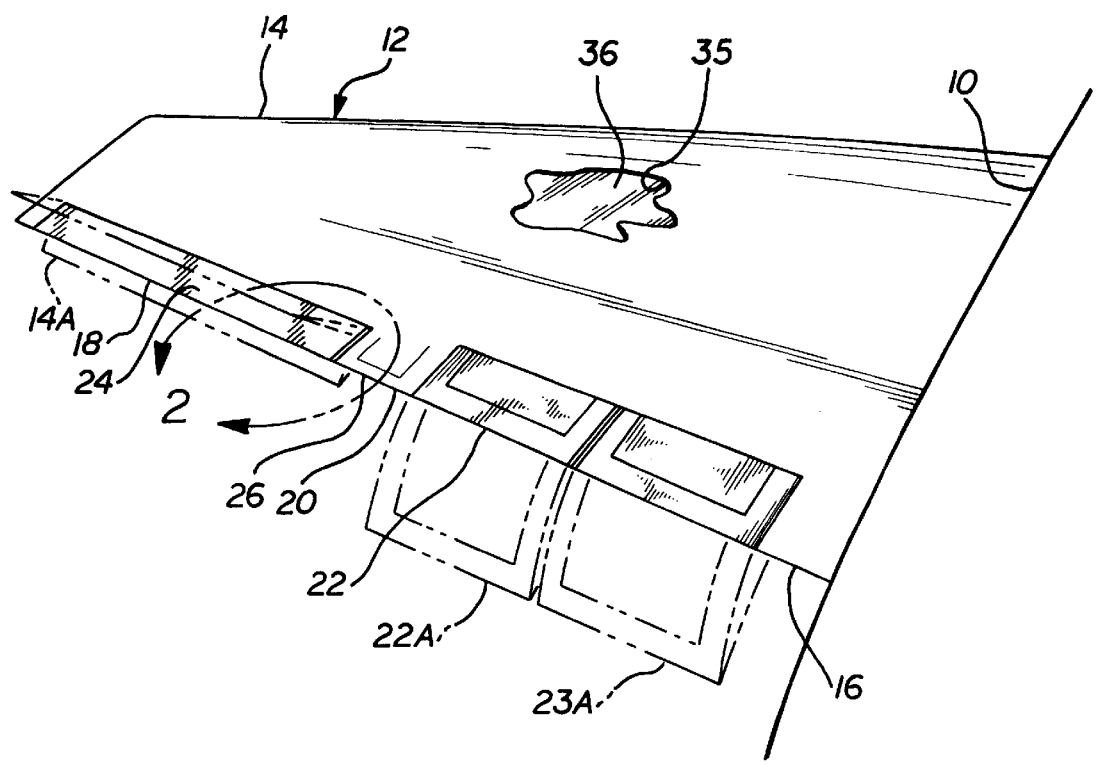
FIG. 1 is a partial perspective view of an aircraft particularly illustrating the control members on the trailing edge of the wing.

Referring to FIG. 1, which is a partial view of an aircraft, designated by numeral 10, it can be seen that the aircraft includes a wing 12 with leading and trailing edges 14 and 16, respectively. Because the leading and trailing edges, 14 and 16, are major contributors to the RCS of the aircraft, special attention must be paid to the design thereof. Reducing the RCS is complicated do to the numerous aerodynamic control members mounted on the trailing edge 16, which include an aileron 18 separated by fixed adjacent wing structure 20 from two flap segments 22 and 23 (their extended position is designated by numerals 18A, 22A and 23A and indicated in dotted lines).

Figure 4:
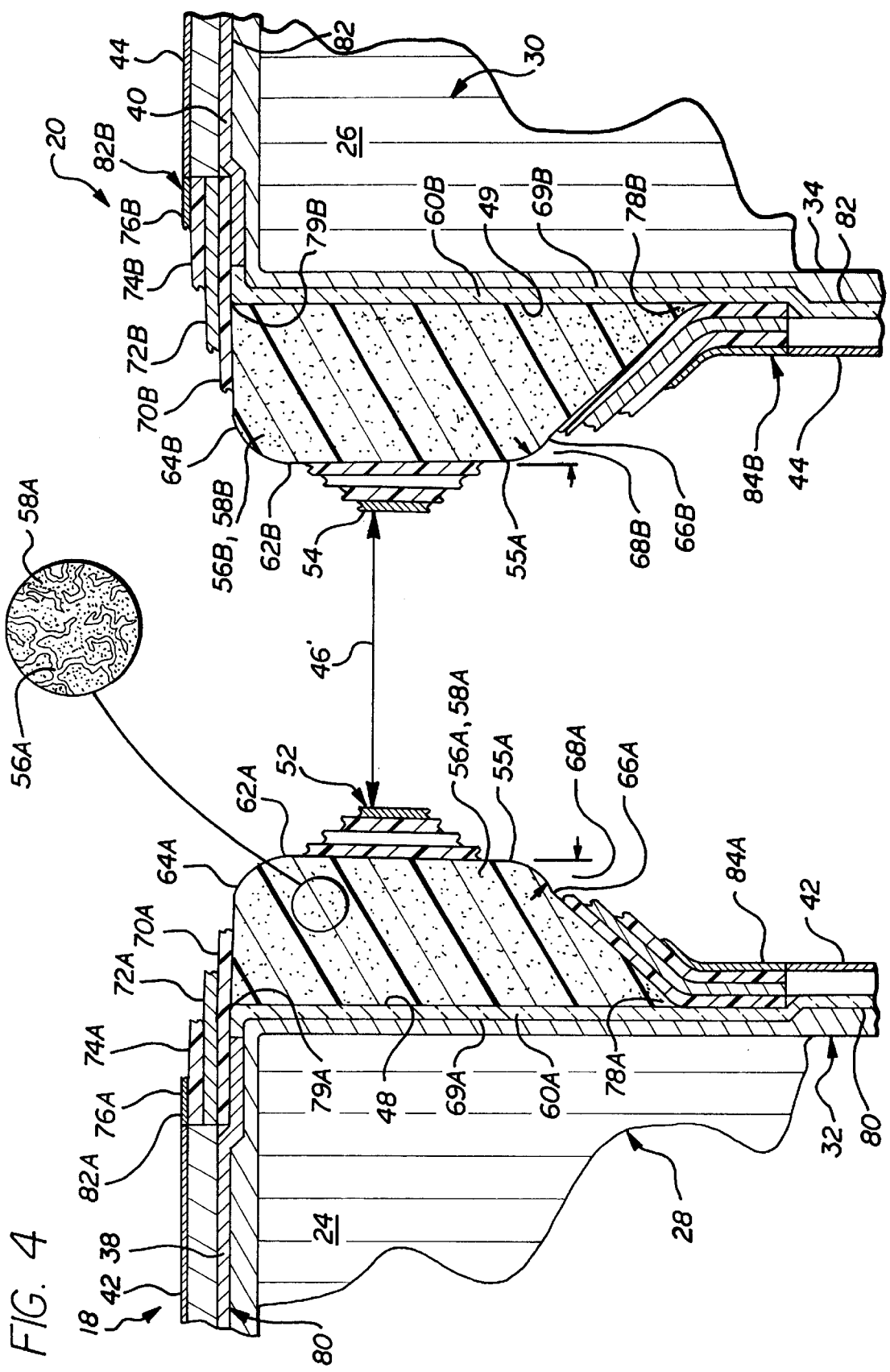
FIG. 4 is a cross-sectional view of the sealing assembly shown in FIG. 3 taken along the line 4—4.

Still referring to FIG. 1 and additionally to FIG. 4, in order to reduce the RCS, the rear and side sections of the aileron 18 and adjacent structure 20, outlined in dotted lines and indicated by numerals 24 and 26, respectively, are typically made of low dielectric material honeycomb core 28 and 30, respectively with a graphite loaded coating (not shown). Cover sheets 32 and 34, also made of low dielectric material, are bonded about the cores 28 and 30, respectively. The exterior surfaces 35 of the aircraft's wing 12 are covered with a radar absorbing coating 36. The exterior surfaces of the aileron 18 and adjacent structure 20 are indicated by numerals 38 and 40, respectively; while the coatings thereon are indicated by numerals 42 and 44, respectively. The composition of the coating 36, 42 and 44, will be subsequently discussed in further detail.

Figure 2:
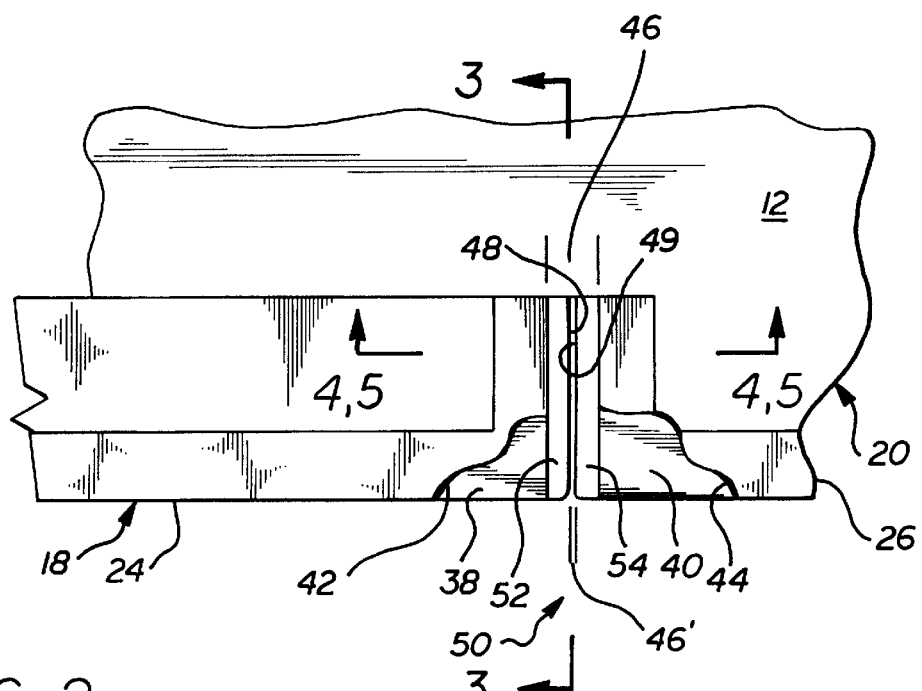
FIG. 2 is an enlarged view of a portion of FIG. 1 taken along the arrow indicated by numeral 2, particularly illustrating the first and second bulb seals of the subject sealing assembly installed on the aileron and adjacent wing structure.

Still referring to FIG. 1 and additionally to FIGS. 2 and 4, it can be seen that a gap, indicated by numeral 46, exists between the side 48 of the aileron 18 and the side 49 of the adjacent structure 20. As previously stated, the gap 46, is necessary to ensure that the wing structure 20 does not interfere with the motion of the aileron 18, especially when the wing 12 is flexing due to aerodynamic loads. Thus a gap would be necessary even if all manufacturing tolerances could be eliminated.

The subject sealing assembly, indicated by numeral 50, includes first and second bulb seals 52 and 54 mounted on the aileron 18 and wing structure 20, respectively, and integrated with the coatings overlap the coatings 42 and 44, in a manner to be subsequently discussed. The flexible bulb seals 52 and 54 still provide for a small gap, indicated by numeral 46'. However, this smaller gap 46', as previously discussed, provides for capacitive coupling between the first and second bulb seals.

The first and second bulb seals, 52 and 54 each include a flexible core, indicated by numerals 55A and 55B, respectively, made of a reticulated (open cell) foam 56A and 56B having a graphite coating (not shown) thereon and which is filled with a flexible closed cell foam 58A and 58B with prevents moisture from collecting therein. The cores 55A and 55B have a bottom surfaces 60A and 60B, top surfaces 62A and 62B, generally parallel to the bottom surfaces, outer side surfaces 64A and 64B, and inner facing side surfaces 66A and 66B at acute angles, indicated by numeral 68A and 68B to the top surfaces 62A and 62B. The outer side surfaces 64A and 64B form general extensions of the external covers 38 and 40 of the aileron 18 and adjacent structure 18, respectively. Preferably the angles 68A and 68B are 45 degrees or less. The cores 55A and 55B act as bulk absorbers for the low frequencies.

First sheets 69A and 69B made of dielectric material, typically fiber glass, are bonded to the bottom surfaces 60A and 60B of the cores 55A and 55B. Second sheets 70A and 70B of resistive material are bonded to the top surfaces 62A and 62B and outer side surfaces 64A, 64B and inner side surfaces 66A and 66B. The sheets 70A and 70B of resistive material are typically sheets of dielectric material having a printed resistive material thereon having a specific ohms/per square. The purpose of sheets 70A and 70B is to provide a smooth transition in impedance from free air to the metallic structure of the aircraft. Third sheets 72A and 72B of magnetic radar absorbing material are bonded over the first sheets 70A and 70B, respectively. These third sheets 72A and 72B are typically a polyurethane matrix material containing iron microspheres and act as a high frequency absorber. Here again the particular "loading" will be dependent upon the design requirements for the aircraft. Bonded over the third sheets 72A and 72B are fourth sheets 74A and 74B of abrasion resistant material. For example SPECTRA 1000™ manufactured by Allied Signal, Petersburg, Va. Finally, coats of paint 76A and 76B, such as a urethane paint incorporating a TEFLON™ powder is used to cover the fourth sheets 74A and 74B of abrasion resistant material to further reduce wear.

Figure 3:
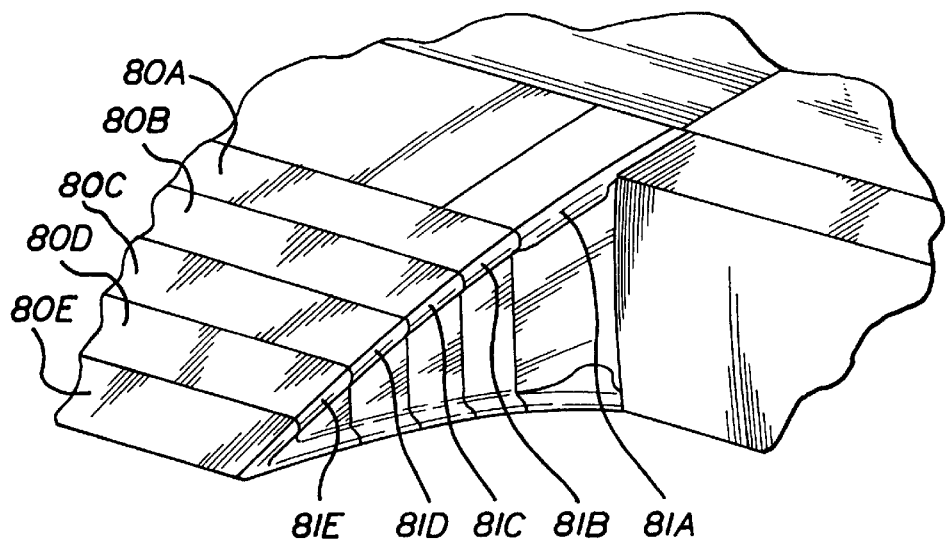
FIG. 3 is a partial perspective view of the aileron shown in FIG. 2 taken along the line 3—3, particularly illustrating the portion of the sealing assembly mounted on the aileron.

Typically the coatings 42 and 44, which include resistive sheets 80 and 82, cover the aileron 18 and adjacent structure 20 including the sides thereof, excepting that portion covered by the bulb seals 52 and 54. Since the purpose of the resistive sheets is to provide a smooth transition in impedance from free air to the metallic structure of the aircraft, it has an ohms per square that varies from a very high value at the outer edge to a very low value so as to provide a relatively smooth impedance translation from free air to the conductive metal interior of the aileron and adjacent structure. Referring to FIG. 3 it can be seen that, for the purpose of illustration, the coating 80 is indicated on the aileron 18 as bands 80A,B,C,D and E. The sheet 70A of resistive material on the bulb seal 52 is selected to match that of the resistive sheet 80 and is indicated as bands 81A,B,C,D and E on the resistive sheet 70. This impedance matching would also be accomplished between the sheet 70B on bulb seal 54 and the resistive sheet 82 of coating 38 on the surface 34 of the adjacent structure 20.

The first sheet 69A, second sheet 70A, third sheet 72A, and fourth sheet 74A extend beyond the corners 78A and 79A of the core 55A of the first bulb seal 52 and are bonded together to form "stepped tail portions" 84A and 86A, respectively. The tail portion 84A extends over onto and is joined to the coating 42, thus eliminating gaps and providing continuous radar absorbing surface. The tail portion 86A is bonded onto the side 48 of the aileron 18. Note that the cover 38 is stepped in the vicinity of the tail portions 78A and 79A so that the sheets 80 and 70A are overlapped providing electrical continuity.

In a similar fashion, the first sheet 69B, second sheet 70B, third sheet 72B, and fourth sheet 74B extend beyond corners 78B and 79B of the core 55B of the second bulb seal 54 and are bonded together to form "stepped tail portions" 82B and 84B. The tail portion 82B extends over onto and is joined to the surface 40 of the adjacent structure 12 is joined to the coating 42 thereon, thus eliminating gaps and providing continuous a radar absorbing surface. The tail portion 72B is bonded to the side 25 of the structure 16 and is joined to coating 44. The cover 40 is also stepped in the vicinity of the tail portions 78B and 79B so that the sheet 82 is overlapped with the sheet 70B.

Figure 5:
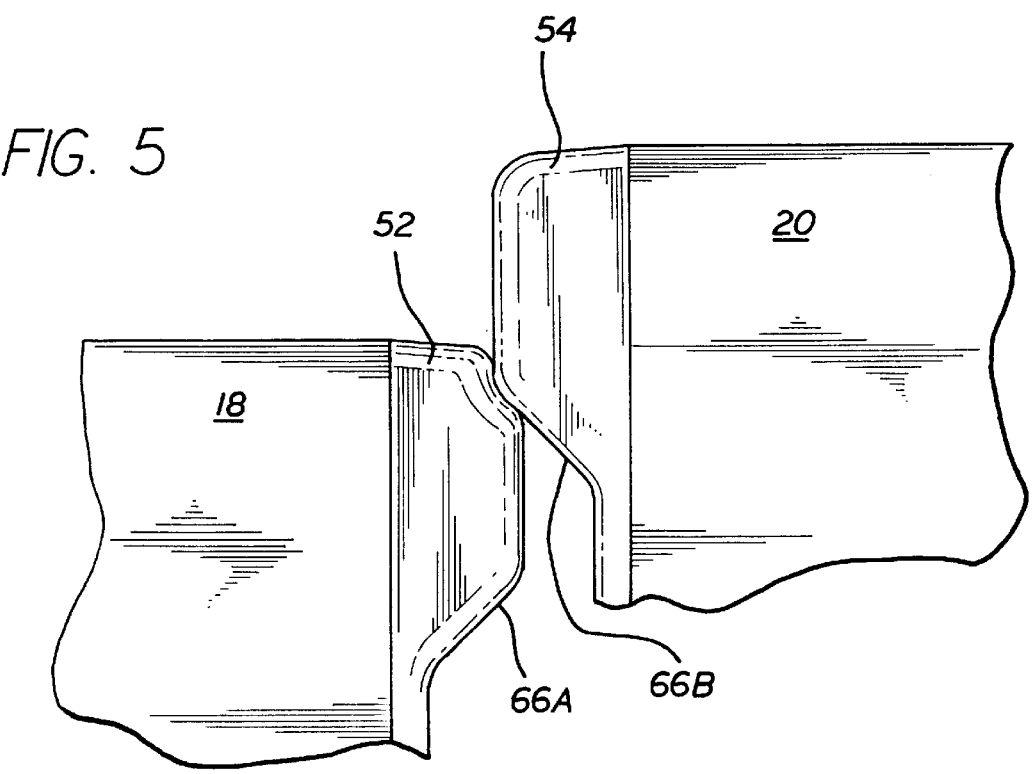
FIG. 5 is a partial cross-section view of the aircraft shown in FIG. 2 with the aileron in a partially extended position particularly illustrating the portions of the sealing assembly in contact with each other.

It can be seen in FIG. 5 that as the aileron 18 is actuated the first and second bulb seals 52 and 54 can easily slide by each other should an interference condition exist. For example, when the wing flexes reducing the gap.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention relates to the aircraft industry and, in particular, to the manufacturers of military aircraft.

We claim:

1. A sealing assembly for reducing the gap between an aircraft's movable flight control member and adjacent structure thereto, the flight control member and structure having external surfaces and side surfaces facing each other, the assembly comprising first and second flexible bulb seals mounted on the periphery of the side surface of both the flight control member and the adjacent structure forming an extension of the external surface of both, each of said bulb seals comprising:

a compressible foam bulk absorber core; said core having a bottom surface, a top surface generally parallel to said bottom surface, an outer side surface, and an inward facing surface at an acute angle to the top surface;

a first sheet of dielectric material bonded to said bottom surface of said core;

a second sheet of flexible resistive material bonded to said top, and sides of said core;

a third sheet of flexible magnetic radar absorbing material bonded to said second sheet; and a fourth sheet of flexible abrasion resistant material bonded over said third sheet.

2. The sealing assembly as set fourth in claim 1 wherein said outer surfaces of said cores of said first and second bulb seals form said extensions of the external surfaces the movable flight control member and the adjacent structure, respectively.

3. The sealing assembly as set forth in claim 2 wherein said acute angle of said inward facing surface of said core is less than 45 degrees.

4. The sealing assembly as set forth in claim 3 wherein said first, second, third and fourth sheets of material of said first and second bulb seals are joined together at the junction of said bottom and outer side surfaces of said cores forming a leg portion, said leg portions of said first and second bulb seals extending onto the external surfaces of the control member and the adjacent structure, respectively, and abutting the coating thereon.

5. The sealing assembly as set forth in claim 4 wherein said first, second, third and fourth sheets of material of said first and second bulb seals are joined together at the junction of said bottom and inner side surfaces of said core forming second leg portions, said second leg portions of said first and second bulb seals extending along the side surfaces of the control member and the adjacent structure, respectively.

6. The sealing assembly as set forth in claim 5 wherein the external surfaces of said control member and the adjacent structure are covered with a coating containing a sheet of resistive material having a specific ohms per square gradient along its length and said second sheet of resistive material of said cores of said first and second bulb seals having a matching ohms per square gradient.

7. The sealing assembly as set forth in claims 1 or 2 or 3 or 4 or 5 or 6 wherein said foam core comprises a flexable reticulated foam core covered with a radar absorbing coating, said reticulated foam core filled with a flexable clsoed cell foam.

8. The sealing assembly as set forth in claim 7 wherein the first and second bulb seals are covered with a low coefficient of friction coating made of a dielectric material.

* * * * *